US006776076B2

United States Patent
Salazar

(10) Patent No.: US 6,776,076 B2
(45) Date of Patent: Aug. 17, 2004

(54) ANGLE GAUGE

(76) Inventor: Mario A. Salazar, 19925 Roaming Dr., Colorado Springs, CO (US) 80908

( * ) Notice: Subject to any disclaimer, the term of this patent is extended or adjusted under 35 U.S.C. 154(b) by 106 days.

(21) Appl. No.: 10/301,248

(22) Filed: Nov. 21, 2002

(65) Prior Publication Data

US 2004/0099115 A1 May 27, 2004

(51) Int. Cl.[7] ............................................... B27B 25/10
(52) U.S. Cl. ..................... 83/435.14; 83/468; 83/468.3; 83/468.7; 83/522.18; 33/471
(58) Field of Search ............................. 83/435.14, 438, 83/468, 468.3, 468.7, 522.18, 698.21; 33/471, 469

(56) References Cited

U.S. PATENT DOCUMENTS

| | | | | |
|---|---|---|---|---|
| 3,138,180 A | * | 6/1964 | Schultz ................ | 83/435.14 X |
| 4,514,909 A | * | 5/1985 | Gilbert ................ | 83/435.14 X |
| 5,038,486 A | * | 8/1991 | Ducate, Sr. .......... | 83/435.14 X |
| 5,379,669 A | * | 1/1995 | Roedig ................ | 83/435.14 X |
| 5,735,054 A | * | 4/1998 | Cole .................... | 83/435.14 X |
| 6,216,574 B1 | * | 4/2001 | Hain ............................ | 83/468 |
| 6,256,900 B1 | * | 7/2001 | Myers ..................... | 33/471 X |
| 6,557,601 B1 | * | 5/2003 | Taylor ................. | 83/435.14 X |
| 6,584,698 B1 | * | 7/2003 | Liu ..................... | 83/435.14 X |
| 2002/0104417 A1 | * | 8/2002 | Chen ........................ | 83/435.14 |

* cited by examiner

Primary Examiner—Charles Goodman
(74) Attorney, Agent, or Firm—Mark G. Pannell; Hanes & Schutz, P.C.

(57) ABSTRACT

An angle sensor has a miter bar, a fence, a rotary sensor, a display, and a processing system and may additionally have a head plate, an auxiliary fence, means for detachably affixing the miter bar to a saw blade, and a power source. The miter bar has a longitudinal axis. Primary fence 6 is pivotally disposed on the miter bar and has a face that defines a plane. The rotary sensor outputs a signal indicative of the angle between the longitudinal axis of the miter bar and the plane of the face. The processing system interprets the signal and activates the display to numerically exhibit the angle. The display provides a visual indication of the angle.

10 Claims, 5 Drawing Sheets

ANGLE GAUGE

FIELD OF THE INVENTION

This invention relates in general to a device for measuring angles and, more particularly, to a miter gauge device.

BACKGROUND OF THE INVENTION

It is important to modern machinists and woodworkers that they be able to precisely shape a work piece. Often shaping the work piece involves cutting mitered angles. Several tools have been developed to help cut mitered angles.

A miter gauge is one tool designed to help cut mitered angles. A conventional miter gauge has a miter bar and a fence assembly. The miter bar is designed to ride in a linear slot machined into a surface of a table. The linear slot is a straight line to which other components are relative. On a table saw, the slot is parallel to the saw blade.

The fence is pivotally attached to the miter bar. The fence is rotatable relative to the miter bar on the plane of the surface of the table. A protractor scale is conventionally indicated on the fence assembly to allow a user to measure the angle of the fence assembly relative to the miter bar. The position where the miter bar is perpendicular to the fence is customarily labeled zero degrees. Typically, a locking mechanism allows the fence to be secured relative to the miter bar.

The angle of the fence relative to the miter bar is set by visually matching a position marker on the fence assembly with a mark on the protractor scale. Conventionally, this step relies on the user's ability to match the marks and the calibration of the position marker.

Some miter gauges also have built-in stops at commonly used angles. These stops help a user more accurately and quickly set the angle of the fence relative to the miter bar. However, these stops are subject to wear, becoming less accurate.

Other miter gauges have interlocking teeth that allow the user to select a multitude of angles. In order to make the teeth of a size adequate to operate well, these teeth are often spaced apart, allowing the user to select angles at increments of about 2 to 3 degrees.

SUMMARY OF INVENTION

According to principles of the present invention, in one embodiment, an angle sensor has a miter bar, a fence, a rotary sensor, a display, and a processing system. The miter bar has a longitudinal axis. The primary fence is pivotally disposed on the miter bar and has a face that defines a plane. The rotary sensor outputs a signal indicative of the angle between the longitudinal axis of the miter bar and the plane of the face. The processing system interprets the signal and activates the display to numerically exhibit the angle. The display provides a visual indication of the angle.

According to further principles of the present invention, the angle gauge may additionally have a head plate, an auxiliary fence, means for detachably affixing the miter bar to a saw blade, and a power source.

DETAILED DESCRIPTION OF THE INVENTION

Figure 1:
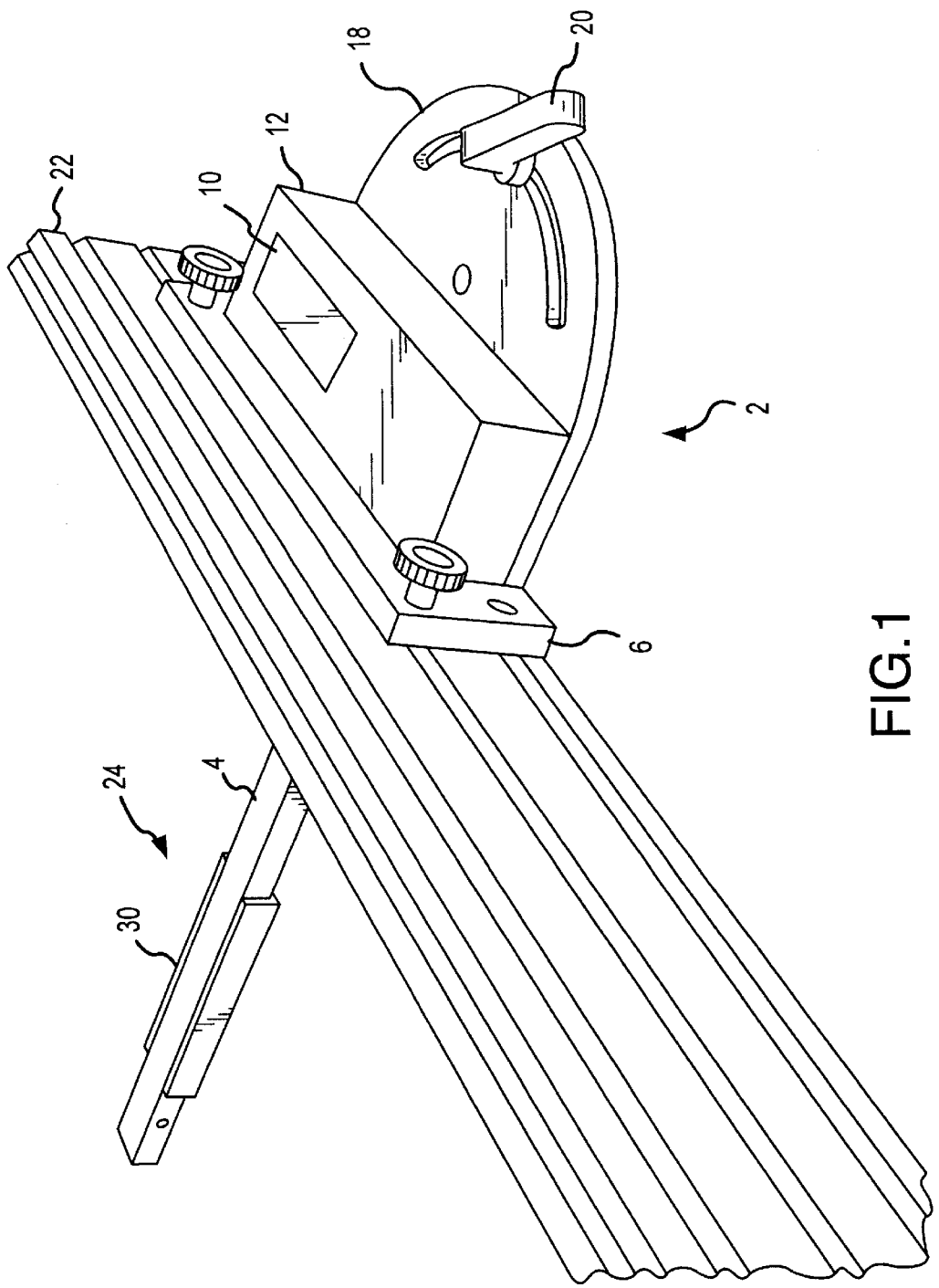
FIG. 1 is an orthogonal illustration of one embodiment of the present invention angle gauge.
Figure 2:
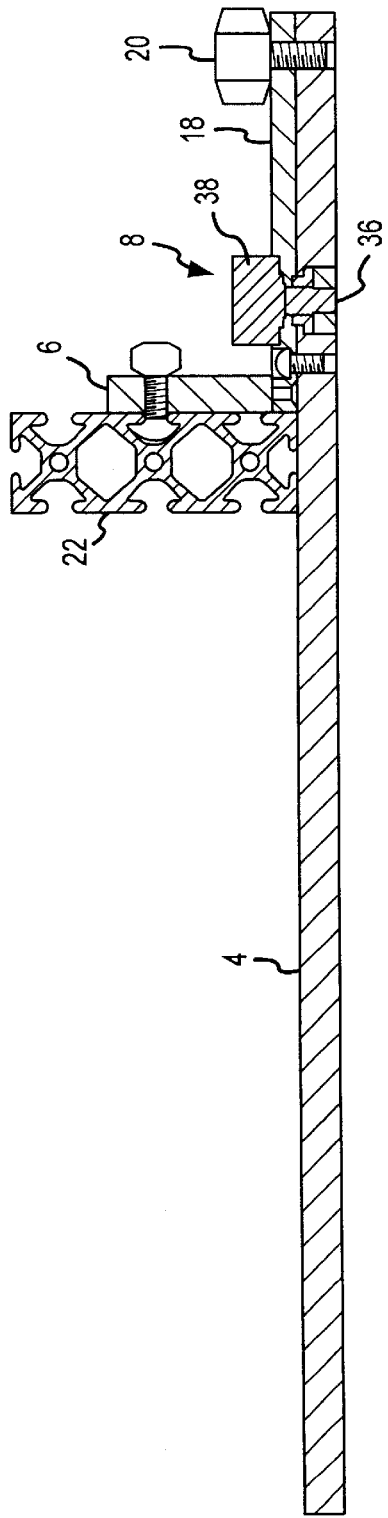
FIG. 2 is a cross-sectional illustration of the angle gauge of FIG. 1.
Figure 3:
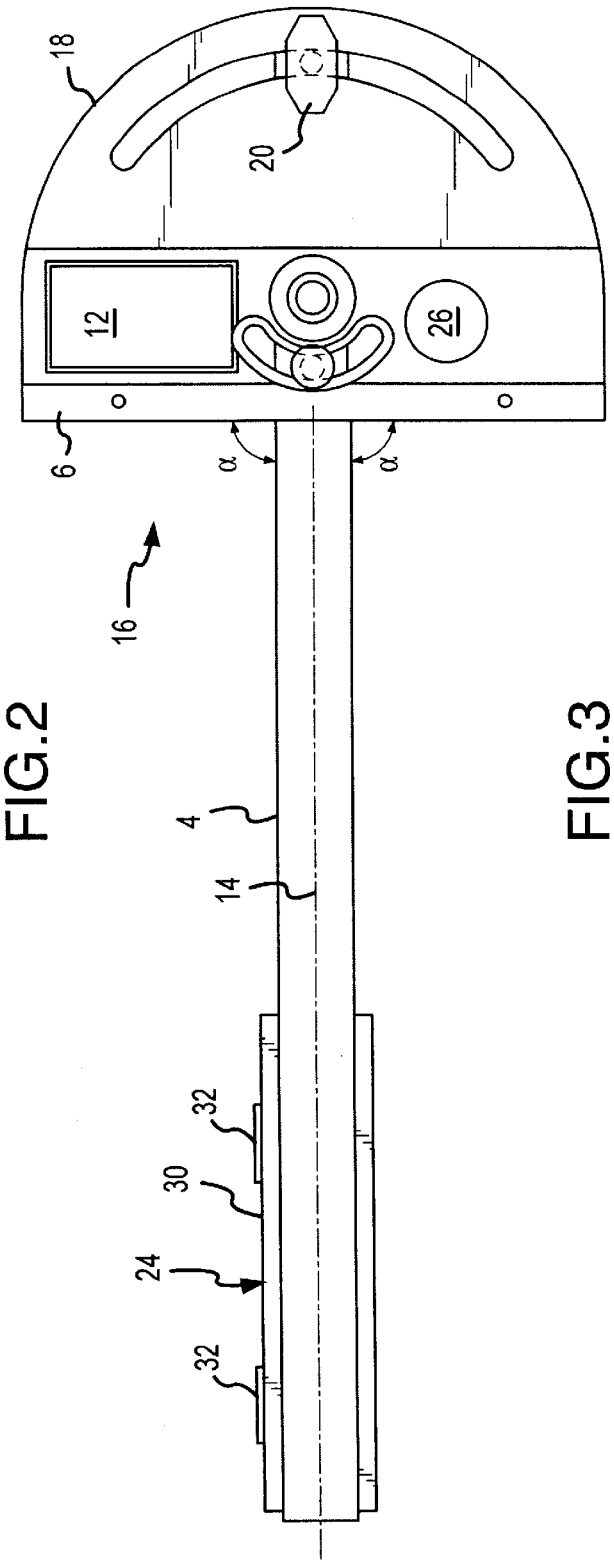
FIG. 3 is an plan view illustration of the angle gauge of FIG. 1.

Shown in FIGS. 1–3 is one embodiment of the present invention angle gauge 2. Angle gauge 2 includes miter bar 4, primary fence 6, rotary sensor 8, display 10, and processing system 12.

Figure 5:
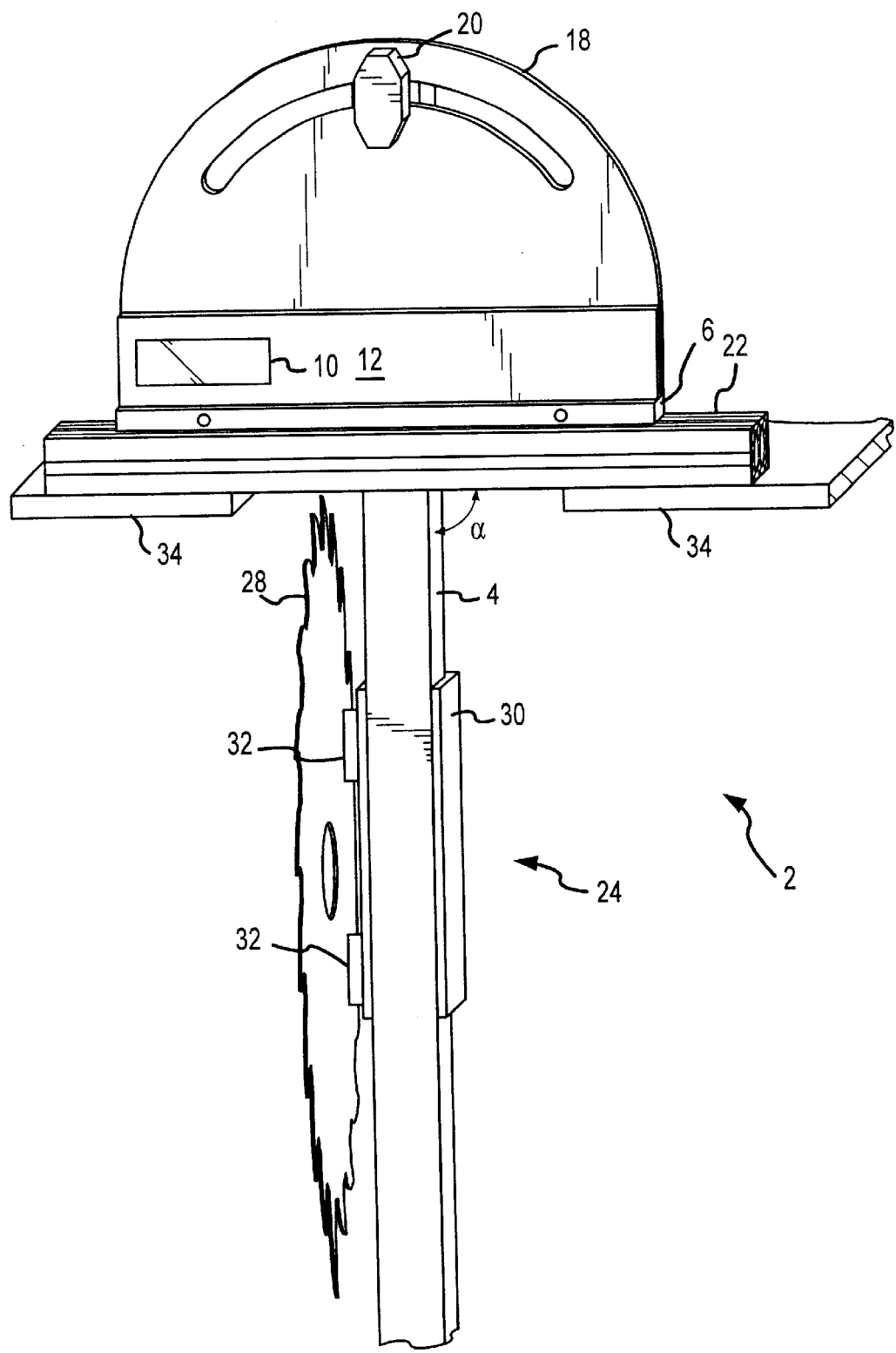
FIGS. 5 and 6 are elevational illustrations of the angle gauge of FIG. 1, positioned to measure the angle of a table saw blade.
Figure 6:
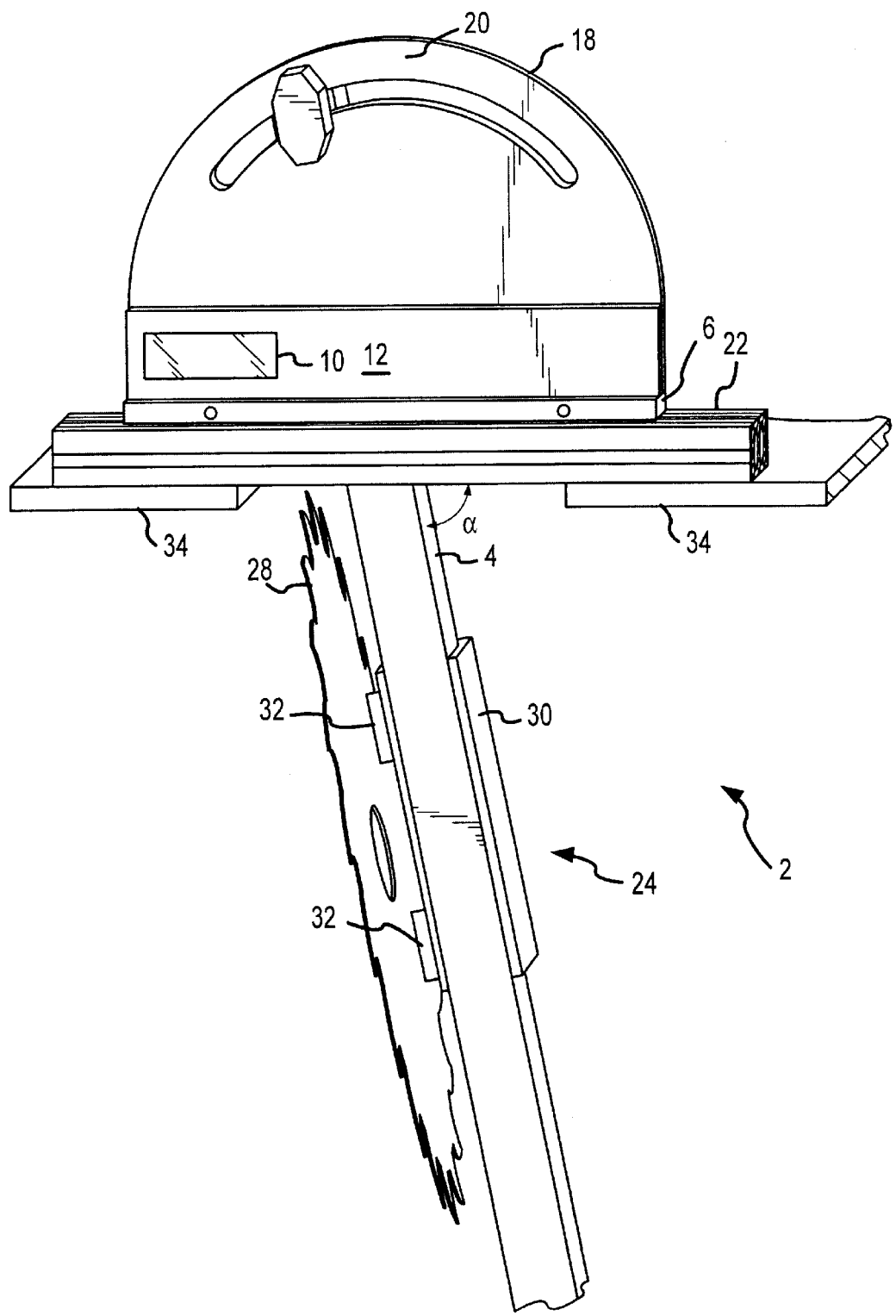

Miter bar 4 is any shaft or bar. Miter bar 4 has longitudinal axis 14. In one embodiment, miter bar 4 is a rectangular bar configured to be slidably received into a slot on a tool table 34 (FIGS. 5 and 6).

Primary fence 6 is any structure having a face 16 defining a plane. In one embodiment, face 16 is a flat surface. In an alternative embodiment, face 16 is not flat, but projections on face 16 define a plane. Primary fence 6 is pivotally disposed on miter bar 4.

Rotary sensor 8 is any device or system configured to output an angle signal indicative of an angle between longitudinal axis 14 of miter bar 4 and the plane of face 16. Examples of rotary sensor 8 include electromechanical and electro-optical devices.

In one embodiment, rotary sensor 8 includes a linear potentiometer having a shaft 36 and a body 38. Shaft 36 is attached, either directly or indirectly, to miter bar 4, while body 38 is attached, either directly or indirectly, to primary fence 6. The terminals of the potentiometer are connected to a positive and a negative potential. As angle is adjusted, a voltage appears at the potentiometer wiper that is a percentage of the positive potential minus the negative potential. This voltage represents angle.

In an alternate embodiment (shown in FIG. 4), rotary sensor 8 includes a magnetic head 40 and magnetic field sensor 42 disposed adjacent magnetic head 40. Magnetic head 40 is attached, either directly or indirectly, to miter bar 4 and magnetic field sensor 42 is attached, either directly or indirectly, to primary fence 6. As angle is adjusted, the relationship between magnetic head 40 and magnetic field sensor 42 is adjusted and a signal is generated by magnetic field sensor 42 that represents angle.

Examples of other embodiments of rotary sensor 8 may include variable capacitors or laser interferometers.

Display 10 is any device or system for providing a visual indication of angle between longitudinal axis 14 of miter bar 4 and the plane of face 16. Examples of display 10 include light emitting diode (LED) and liquid crystal display (LCD) displays. In one embodiment, a switch is provided for inverting the display so that the angle indicated by the display may be read from the opposite side of the display.

Processing system 12 is any device or system configured to interpret the angle signal and activate display 10 to exhibit the angle indicated by the angle signal. In one embodiment, processing system 12 includes a microprocessor and supporting circuitry. In an alternative embodiment, processing system 12 includes circuitry without a microprocessor. Optionally, processing system 12 includes a housing.

Optionally, angle gauge 2 also has a head plate 18, securing means 20, auxiliary fence 22, affixing means 24, and power source 26. Power source 26 is any source for supplying power to processing system 12 and display 10.

Head plate 18 affixed to primary fence 6. In one embodiment, head plate 18 is affixed between primary fence 6 and miter bar 4. In an alternative embodiment, head plate 18 is not affixed between primary fence 6 and miter bar 4. In another embodiment, head plate 18 is integral to primary fence 6.

Securing means 20 is any device configured to fix angle of longitudinal axis 14 relative to the plane of face 16. In one embodiment, securing means 20 includes means for securing miter bar 4 to head plate 18 to fix the angle of longitudinal axis 14 relative to the plane of face 16. In an alternative embodiment, securing means 20 directly secures primary fence 6 to miter bar 4. One example of securing means 20 is a lock screw.

Auxiliary fence 22 is any fence structure attached to face 16 of primary fence 6.

Affixing means 24 is any means for detachably affixing miter bar 4 to a saw blade 28. In one embodiment, affixing means 24 includes sleeve 30 securable to miter bar 4 and at least one magnet 32 affixed to sleeve 30. Each magnet 32 secures to saw blade 28, holding miter bar 4 against saw blade 28.

In one configuration, angle gauge 2 is used as a miter gauge for a tool having a table with a slot therein. In an alternate configuration, angle gauge 2 is used to adjust the angle of a tool.

Figure 4:
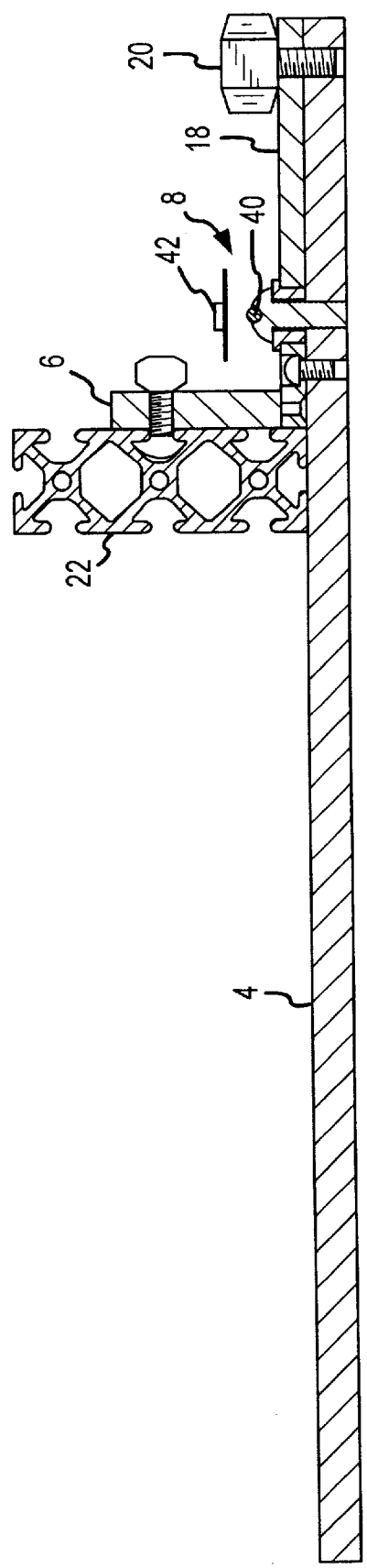
FIG. 4 is a cross-sectional illustration of the angle gauge of FIG. 1 showing an alternate embodiment of the rotary sensor.

FIGS. 4 and 5 illustrate how angle gauge 2 is used to adjust the angle of a table saw blade. Either with or without auxiliary fence 22, angle gauge 2 is placed with the fence down upon table 34. Miter bar 4 is inserted into the blade cavity adjacent saw blade 28. Affixing means 24 secures miter bar 4 to saw blade 28. In this configuration, the angle of saw blade 28 with respect to table 34 is the same as angle.

As the angle of saw blade 28 is adjusted, the numerical value of angle is provided on display 10. This allows a user to accurately determine the angle of the saw blade 28 with respect to table 34.

The foregoing description is only illustrative of the invention. Various alternatives and modifications can be devised by those skilled in the art without departing from the invention. Accordingly, the present invention embraces all such alternatives, modifications, and variances that fall within the scope of the appended claims.

What is claimed is:

1. An angle gauge comprising, a miter bar having a longitudinal axis;

a primary fence having a face defining a plane, the primary fence pivotally disposed on the miter bar;

a rotary sensor configured to output an angle signal indicative of the angle between the longitudinal axis of the miter bar and the plane of the face;

a display for providing a visual indication of the angle between the longitudinal axis of the miter bar and the plane of the face; and a processing system configured to interpret the angle signal and activate the display to exhibit the angle indicated by the angle signal.

2. The angle gauge of claim 1 wherein the rotary sensor includes a potentiometer.

3. The angle gauge of claim 1 wherein the rotary sensor includes: a magnetic head, and a magnetic field sensor disposed adjacent the magnetic head.

4. The angle gauge of claim 1 further including a head plate affixed to the primary fence.

5. The angle gauge of claim 4 further including means for securing the miter bar to the head plate to fix the angle of the longitudinal axis relative to the plane of the face.

6. The angle gauge of claim 1 further including means for fixing the angle of the longitudinal axis relative to the plane of the face.

7. The angle gauge of claim 1 further including an auxiliary fence attached to the face of the primary fence.

8. The angle gauge of claim 1 further including means for detachably affixing the miter bar to a saw blade.

9. The angle gauge of claim 1 further including:

a sleeve securable to the miter bar, and a magnet affixed to the sleeve.

10. The angle gauge of claim 1 further including a power source for supplying power to the processing system and the display.

* * * * *